United States Patent
Vosejpka et al.

(10) Patent No.: US 9,593,998 B2
(45) Date of Patent: Mar. 14, 2017

(54) METHOD FOR DETERMINING CURRENT ECCENTRICITY OF ROTATING ROTOR AND METHOD OF DIAGNOSTICS OF ECCENTRICITY OF ROTATING ROTOR

(71) Applicant: Doosan Skoda Power s.r.o., Plzen (CZ)

(72) Inventors: Jan Vosejpka, Plzen (CZ); Vaclav Cerny, Plzen (CZ)

(73) Assignee: DOOSAN SKODA POWER S.R.O., Plzen (CZ)

( * ) Notice: Subject to any disclaimer, the term of this patent is extended or adjusted under 35 U.S.C. 154(b) by 440 days.

(21) Appl. No.: 14/346,164

(22) PCT Filed: Sep. 20, 2012

(86) PCT No.: PCT/CZ2012/000094
§ 371 (c)(1),
(2) Date: Mar. 20, 2014

(87) PCT Pub. No.: WO2013/041065
PCT Pub. Date: Mar. 28, 2013

(65) Prior Publication Data
US 2014/0238128 A1  Aug. 28, 2014

(30) Foreign Application Priority Data
Sep. 21, 2011  (CZ) ................ PV 2011-588

(51) Int. Cl.
*G01H 1/00* (2006.01)
*G01M 1/22* (2006.01)
(Continued)

(52) U.S. Cl.
CPC .............. *G01M 1/16* (2013.01); *G01M 1/22* (2013.01); *G01M 15/14* (2013.01); *G01H 1/003* (2013.01)

(58) Field of Classification Search
CPC combination set(s) only.
See application file for complete search history.

(56) References Cited

U.S. PATENT DOCUMENTS 6,263,738 B1  7/2001  Hogle

FOREIGN PATENT DOCUMENTS

RU  2375692  * 12/2009  ............ G01M 15/00

OTHER PUBLICATIONS

International Search Report for PCT/CZ2012/000094 dated Jan. 18, 2013.

* cited by examiner

*Primary Examiner* — Huan Tran
(74) *Attorney, Agent, or Firm* — Sughrue Mion, PLLC

(57) ABSTRACT

A method is provided for determining current eccentricity of a rotating rotor which is equipped with a phase marker scanned at constant speed of rotation up to 500 rpm by a sensor of a phase marker at the point of the phase marker, and outside of the phase marker by at least one sensor of relative rotor vibrations, while after digitizing the signals of the sensors, estimates current position of the phasor of the 1$^{st}$ harmonic component of signal of the sensor of relative rotor vibrations in the complex plane, which is subsequently compared to a reference position of the phasor of the 1$^{st}$ harmonic component, which has been determined in advance, whereas the variation vector of the phasors is an image of eccentricity of the rotor. Further, a method of diagnostics of eccentricity of a rotating rotor is based on this method for determining current eccentricity.

13 Claims, 2 Drawing Sheets

(51) Int. Cl.
*G01M 1/16* (2006.01)
*G01M 15/14* (2006.01)

METHOD FOR DETERMINING CURRENT ECCENTRICITY OF ROTATING ROTOR AND METHOD OF DIAGNOSTICS OF ECCENTRICITY OF ROTATING ROTOR

CROSS REFERENCE TO RELATED APPLICATIONS

This is a National Stage of International Application No. PCT/CZ2012/000094 filed Sep. 20, 2012, claiming priority based on Czech Republic Patent Application No. PV 2011-588 filed Sep. 21, 2011, the contents of all of which are hereby incorporated by reference in their entirety.

TECHNICAL FIELD

The invention relates to a method for determining current eccentricity of rotating rotor.

The invention also relates to a method of diagnostics of eccentricity of rotating rotor.

BACKGROUND ART

In the area of rotors and rotor systems eccentricity means deformation of the rotor or the rotor system in the sense of a bend showing itself when the rotor is being rotated at low revolutions (e.g. by means of turning gear), at which dynamic excitation forces (e.g. from rotating unbalance) and flexibility of the rotor or the rotor system are not effective. With steam turbines for instance, the deformation is usually caused by heterogeneous temperature field formed upon contact of the rotor or rotor system with stator parts, during saturation of shaft seals or during soaking a flow path of the turbine by means of steam before switching the machine to operating speed, during cooling the machine after it has been shut down and operating it by means of turning gear before full stand-still, during temporary interruption of permanent rotor or rotor system rotation on the turning gear when soaking or cooling, etc. If the eccentricity of the rotor or the rotor system is not discovered in time, it can cause damages of the machine and, in extreme cases, its complete breakdown. This danger is increased especially within a band of critical speeds (natural frequencies) where up to multiple increase of amplitude of vibrations of the rotor or rotor system occurs, being caused by high amplitude of excitation force from an unbalance (from the point of view of analysis of dynamic features, the bend itself behaves as an unbalance) as well as by resonance amplification.

At present, the eccentricity of the rotor or the rotor system in the case of steam turbines is determined based on measurement of the rotor or the rotor system deviation against the stator part at low speeds of the machine by means of a sensor (the usual operating principle of which are eddy currents) placed furthest from the rotor or the rotor system bearings towards the centre of the flow path. Subsequently, there are two basic methods to be used to assess the eccentricity. In the first of them, the swing or amplitude of oscillation of the sensor signal at the point of measurement is monitored and measured values are compared to allowed limits. In the other method, time behaviour or trend of the sensor signal is monitored, which is further compared to common values. The method requires increased attention of service personnel and its considerable experiences, which is its major disadvantage. However, both methods may lead to considerably distorted results that could be inconsistent with reality, because the eccentricity of the rotor or the rotor system cannot be uniquely determined solely from time series of measured signals, without appropriate reference signal. Even if the reference signal, measured for example at the moment when the rotor/rotor system would be straight was available by any of the methods, it would not be clear from its comparison to the measured signals whether the possible deviation was caused only by the eccentricity of the rotor or the rotor system or by another kind of defect occurring at the point of measurement—for example by ovality, increased roughness of the surface resulting from long-term operation, etc. None of the current methods thus leads to unique determination of the eccentricity of the rotor or the rotor system, and does not allow its exact diagnostics.

The goal of the invention is to propose a method for determining current eccentricity of rotating rotor which would provide sufficiently exact values and, based on such method, designed diagnostics of eccentricity of rotating rotor.

SUMMARY

The goal of the invention is achieved by a method for determining current eccentricity of rotating rotor, by which is the rotor equipped with a phase marker scanned at constant speed of up to 500 rpm at the point of the phase marker by a sensor of the marker and outside of the phase marker by at least one sensor of relative rotor vibrations, and after digitizing the signals from the sensors, current position of phasor of the $1^{st}$ harmonic component of the signal of the sensor of relative rotor vibrations in the complex plane is estimated. Subsequently, the position is compared to a reference position of the phasor of the $1^{st}$ harmonic component of the signal which has been determined in advance, whereas their variation vector is an image of current eccentricity of the rotor. In that way, current eccentricity of rotating rotor is determined much more exactly and more flexibly than ever before.

Another advantage of the method is that, in the case of steam turbine rotors for instance, common field instrumentation of these turbines can be used for it without any further modifications. In such cases, is the rotor outside of the phase marker scanned by at least two sensors of relative rotor vibrations, which are positioned in one plane of measuring that is perpendicular to the rotor axis, or by those sensors positioned in different planes of measuring. To estimate the current position of the phasor of the $1^{st}$ harmonic component of the signal of the sensor of relative rotor vibrations in the complex plane, signal of at least one of those sensors is used afterwards.

Hereat, the reference position of the phasor of the $1^{st}$ harmonic component of the signal of the sensor of relative rotor vibrations in the complex plane is determined by estimation from digitized signal of the sensor of the phase marker and digitized signal of the sensor of relative rotor vibrations at scanning straight rotor rotating at constant speed of up to 500 rpm.

To estimate the current and the reference position of the phasor of the $1^{st}$ harmonic component of the signal of the sensor of relative rotor vibrations in the complex plane, method of quadratic optimization of the mathematical model in the form of Fourier series is used whose advantage consists in its resistance to errors of measuring of signals of the sensors.

For undistorted determination of current eccentricity, it is also advantageous to filter the signal of the sensor of relative rotor vibrations before applying the method of quadratic optimization. As a suitable filter, quadratically optimal low-pass third-order frequency filter with sharp amplitude characteristics near the cut-off frequency can be used in particular.

Besides that, the goal of the invention can be also achieved by a method of diagnostics of eccentricity of rotating rotor based on the method of determining current eccentricity of rotating rotor. Its principle consists in that the rotor equipped with a phase marker is scanned at constant speed of up to 500 rpm at the point of the phase marker by a sensor of the marker and outside of the phase marker by at least one sensor of relative rotor vibrations, while after digitizing the signals from the sensors, is from them until stabilization being estimated current position of the phasor of the $1^{st}$ harmonic component of the sensor signal of relative rotor vibrations in the complex plane. After stabilizing, the position of the phasor endpoint is compared to the position of the endpoint of the predefined reference position of the phasor of the $1^{st}$ harmonic component of the signal and/or its predefined tolerance band and based on their mutual position the eccentricity of the rotor is diagnosed as acceptable or unacceptable for further operation.

The tolerance band of the reference position of the endpoint is with advantage determined by a finite element method (FEM), whereas the rotor eccentricity is diagnosed as acceptable for further operation only if the endpoint of the phasor of the $1^{st}$ harmonic component of the signal of the sensor of relative rotor vibrations is located within this tolerance band.

The reference position of the phasor of the $1^{st}$ harmonic component of the signal of the sensor of relative rotor vibrations in the complex plane is determined by estimation from digitized signal of the sensor of the phase marker and digitized signal of the sensor of relative rotor vibrations at scanning straight rotor rotating at constant speed of up to 500 rpm.

To estimate the current and the reference position of the phasor of the $1^{st}$ harmonic component of the signal of the sensor of relative rotor vibrations in the complex plane, method of quadratic optimization of the mathematical model in the form of Fourier series is used, which advantage is its resistance to errors of measuring signals of the sensors.

For undistorted diagnostics of the rotor eccentricity, it is also advantageous to filter the signal of the sensor of relative rotor vibrations before applying the method of quadratic optimization. As a suitable filter, quadratically optimal low-pass third-order frequency filter with sharp amplitude characteristics near the cut-off frequency can be used in particular.

Finally, deflection of the rotor or rotor system is determined along its axial length by the finite element model under boundary conditions given by current eccentricities of the rotor or rotor system in different axial locations.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
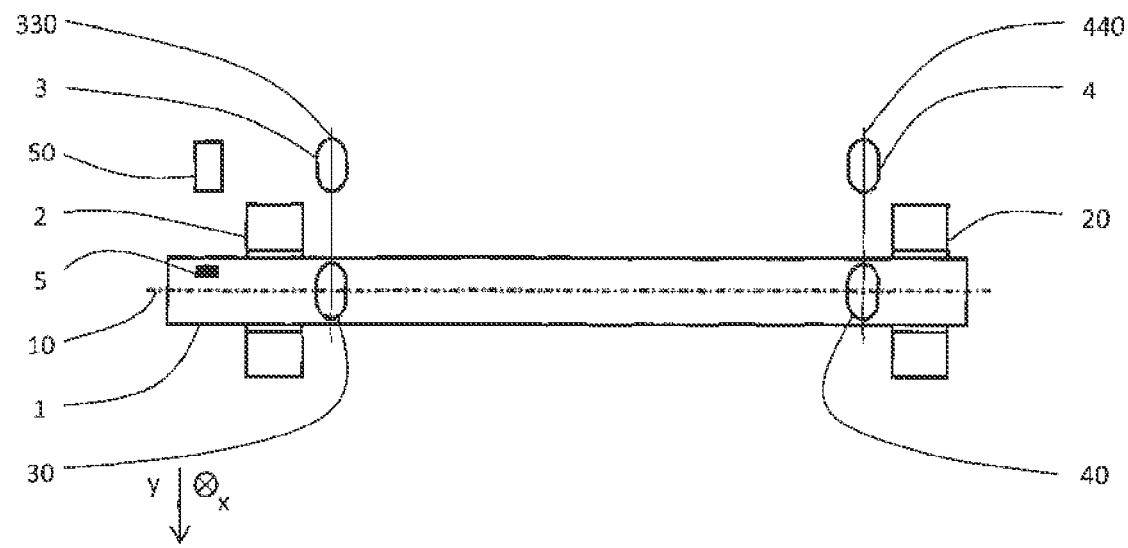
FIG. 1 is a schematic perspective of the rotor of a steam turbine without blades and other constructional elements according to an exemplary embodiment.

The method for determining current eccentricity of rotating rotor according to the invention will be described on example of determining eccentricity of steam turbine rotating rotor 1 shown in FIG. 1. This rotor 1 is mounted in two radial bearings 2 and, 20 while is scanned near each of them by pair of sensors 3, 30 and 4, 40 for measuring relative rotor vibrations, which are located in planes 330 and 440 of measuring perpendicular to the axis 10 of rotor 1, at equal distance from it, whereas sensors 3, 30 and 4, 40 of each pair are mutually shifted by 90° in the tangential direction. Besides that, the rotor 1 is outside of the planes 330 and 440 of measuring equipped by phase marker 5, and is scanned at the point of its location by sensor 50 of the phase marker 5. The phase marker 5 and all sensors 3, 30, 4, 40, 50 are standard parts of field instrumentation of steam turbine rotor 1 and have been used only for determining the speed of its rotation and its relative vibrations so far.

Signals of relative rotor vibration sensors 3, 30, 4, 40 and signal of the sensor 50 of the phase marker 5 are digitized prior to further processing by not shown known A/D converters. From each pair of sensors 3, 30 and 4, 40 signal of single arbitrary sensor 3, 30, 4, 40 is always used, as it is advantageous for easier result processing and evaluation to use signals of sensors 3, 30, 4, 40 aligned side by side—i.e., for instance, of sensors 3 and 4 which are located above the rotor 1 in FIG. 1, as no further compensation of their mutual shift is necessary in that case. Subsequently, the current position of the phasor of the $1^{st}$ harmonic component of each of the signals of sensors 3, 4 of relative rotor vibrations in the complex plane is estimated by application of suitable mathematical model, which is further compared to the reference position of the phasor of the $1^{st}$ harmonic component of these signals, which has been determined in advance. The variation vector of the current position of the phasor and the reference position of the phasor is then an image of eccentricity of the rotor 1 in planes 330, 440 of measuring of given sensor 3 or 30, resp. 4 or 40 of relative rotor vibrations.

A suitable mathematical model to estimate the current position of the phasor of the 1st harmonic component is Fourier series, coefficients of which are estimated by means of quadratic optimization method (least mean squares). The advantage of this method, in contrast to standard Euler-Fourier formulas, is its high resistance to errors of measuring of signals of the sensors 3, 30, 4, 40, which for example consist in aperiodicity of their signals caused by inaccuracy of sensors 3, 30, 4, 40 and/or inappropriate processing of their signals.

Hereat, the reference position of the phasor of the $1^{st}$ harmonic component of the signal of the sensor 3, 30, 4, 40 of relative rotor vibrations is determined with advantage by the same method—i.e. by application of the same mathematical model and method of estimating on digitized signal of relevant sensor 3, 30, 4, 40 and using signal of sensor 50 of the phase marker 5 at rotation of straight rotor 1. Due to the fact that this reference position reflects production inaccuracies of the rotor 1, it is usually not located in zero of the complex plane.

At continuous determination of current eccentricity of rotating rotor 1 and continuous tracking trajectory of the endpoint of the phasor of the 1$^{st}$ harmonic component in time it is possible to diagnose the eccentricity of the rotor 1 easily taking the reference position of the endpoint of the phasor of the 1$^{st}$ harmonic component into consideration, whereas the trajectory of the endpoint of the phasor of the 1$^{st}$ harmonic component simultaneously refers to possible changes of eccentricity, which may be caused by different influences as for example by gradual soaking or cooling of flow path of steam turbine, etc. To determine sufficiently representative position of the phasor of the 1$^{st}$ harmonic component only few revolutions of the rotor rotating at constant speed of up to 500 rpm when dynamic excitation forces causing vibrations of the rotor 1 (e.g. from unbalance) are not effective yet, are enough.

Further on, it is suitable for practical utilization to provide the reference position of the phasor of the 1$^{st}$ harmonic component in the complex plane with appropriate tolerance band representing allowed eccentricity of the rotor 1, at which the rotor 1 can be still operated, resp. to continue in putting into operation, shutting down or other operational task of the given machine can be proceeded. In case that the current position of the phasor of the 1$^{st}$ harmonic component of the signal of the sensor 3, 30, 4, 40 is out of the tolerance band, the eccentricity of the rotor 1 is not admissible and it is necessary to adopt suitable steps to remove the eccentricity—e.g. by means of extending machine soaking or cooling time, etc. It is also important for eccentricity diagnostics to stabilize the position of the phasor of the 1$^{st}$ harmonic component of the signal of given sensor 3, 30, 4, 40 in the complex plane, or to keep it unchanged within relatively long period of time consisting of hours for instance, by means of which temporary influences of external circumstances on eccentricity of the rotor 1, such as the temperature of the jacking or lubricating oil in bearings of steam turbines etc., are eliminated. The tolerance band range can be determined with advantage by calculation employing the finite element method, by means of which the rotor 1 vibration amplitude within its operational speed range is determined first of all and depending on size of the deviation of the rotor 1 bend from the static bend curve given by its design. The tolerance band range is then equal to the deviation of the rotor 1 bend from the static bend curve in planes 330, 440 of measuring, at which the rotor 1 vibration amplitude is smaller than radial clearances in the flow path of the machine.

It is advantageous before processing signals of the sensors 3, 30, 4, 40 to filter these signals before quadratic optimization method for removing noises, which are for example image of various surface roughness or uncircularities of the rotor 1 in planes 330 and 440 of measuring and which could distort the estimation of the position of the phasor of the 1$^{st}$ harmonic component in the complex plane. As a suitable filter removing high-frequency components from the signals and inhibiting the amplitudes of the low-frequency components only slightly is optimal low-pass frequency filter according to a quadratic criterion of optimality, which penalizes difference between the input and output signals of the filter, and amplitude characteristics of which is sharp near the cut-off frequency. The filter can be described by following difference equation for instance:

$$y(k) = -\frac{d_2}{d_1}y(k-1) - \frac{d_3}{d_1}y(k-2) - \frac{d_4}{d_1}y(k-3) +$$
$$\frac{n_1}{d_1}u(k) + \frac{n_2}{d_1}u(k-1) + \frac{n_3}{d_1}u(k-2) + \frac{n_4}{d_1}u(k-3)$$

where u(k) is the input signal, y(k) is the output (filtered) signal and $d_1, \ldots, d_4, n_1, \ldots, n_4$ are parameters of the filter.

At application of the method for determining current eccentricity of rotating rotor 1 according to the invention and diagnostics of eccentricity of the rotor based on it, signals from standard sensors 3, 30, 4, 40 designed to measure relative rotor vibrations are used, which is more advantageous than current approach using installation of at least one additional sensor and its service peripheries and current method for evaluation, not only from the point of view of costs but also accuracy of determining the current eccentricity and possibilities of its diagnostics, as is shown on the following specific example.

Moreover, determination of current eccentricity of the rotor 1 in the planes 330, 440 of measuring by usage of signals of sensors 3 and 4 or 30 and 40 enables to assess deflection of the rotor 1 along its axis 10 with the help of its finite element model, while current eccentricities of the rotor 1 in the planes 330, 440 of measuring are used as boundary conditions of this model.

Figure 2:
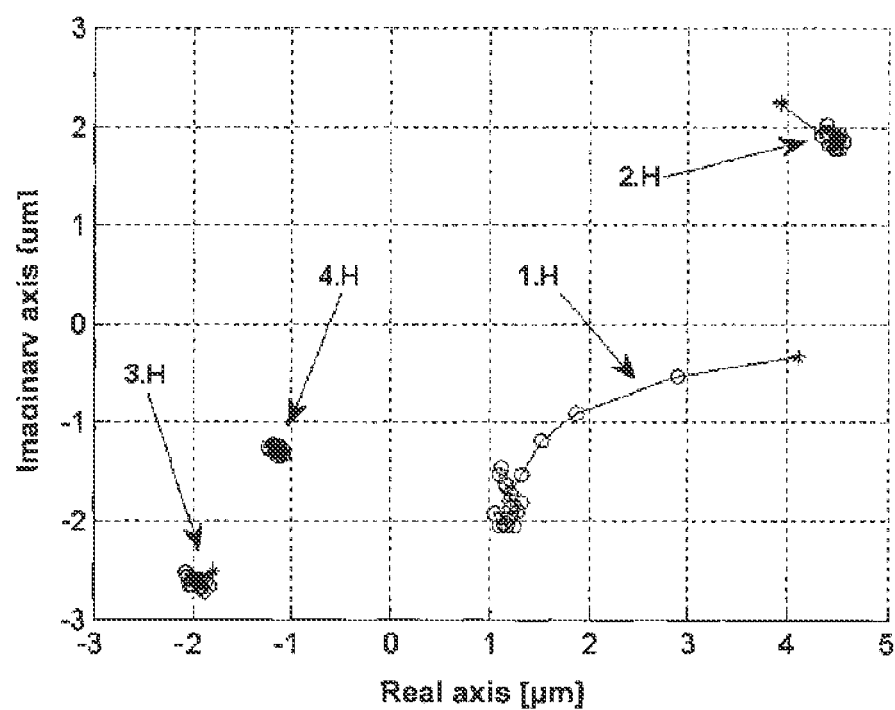
FIG. 2 shows trajectories of endpoints of phasors of the $1^{st}$, $2^{nd}$, $3^{rd}$ and $4^{th}$ harmonic component of the signal of the sensor 3 of relative rotor vibrations in plane of measuring 330 in direction of axis Y according to FIG. 1.
Figure 3:
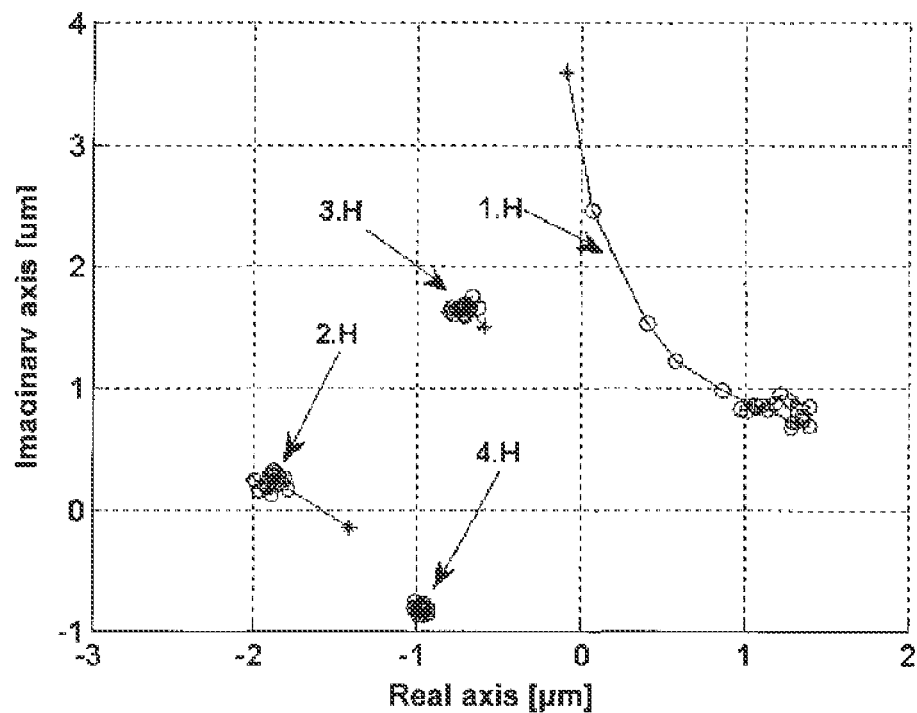
FIG. 3 shows trajectories of endpoints of phasor of the $1^{st}$, $2^{nd}$, $3^{rd}$ and $4^{th}$ harmonic component of the signal of the sensor 30 of relative rotor vibrations in plane of measuring 330 in direction of axis X according to FIG. 1.
Figure 4:
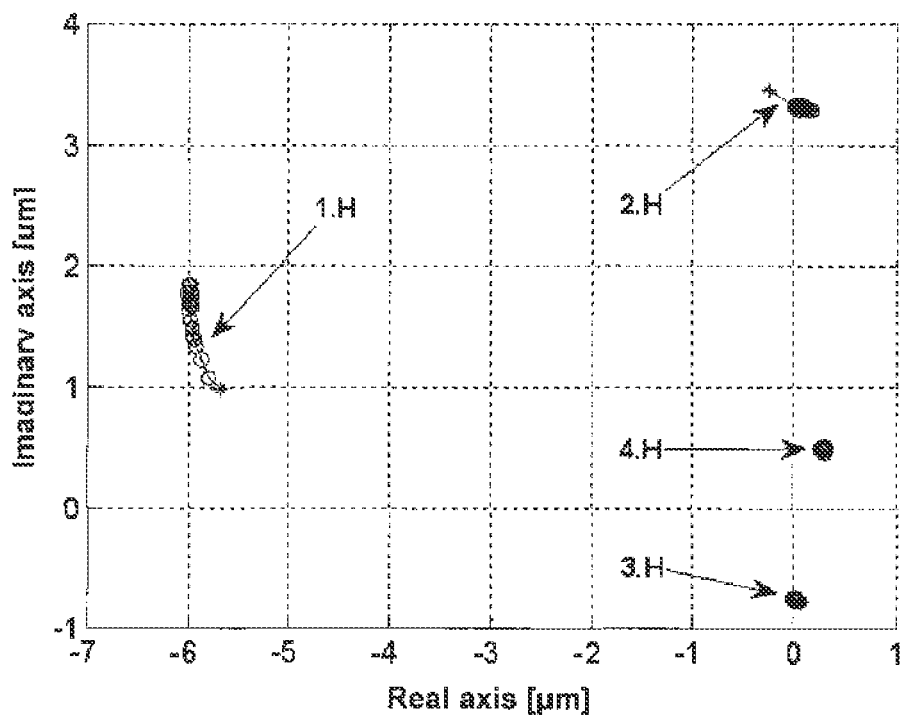
FIG. 4 shows trajectories of endpoints of phasor of the $1^{st}$, $2^{nd}$, $3^{rd}$ and $4^{th}$ harmonic component of the signal of the sensor 4 of relative rotor vibrations in plane of measuring 440 in direction of axis Y according to FIG. 1.

With a specific single-body steam turbine with two radial bearings 2, 20 (see FIG. 1) it was verified experimentally during development of the method for determining current eccentricity of rotating rotor 1 according to the invention that the position of the phasor of the 1$^{st}$ harmonic component of the signal of the sensor 3, 30, 4, 40 of relative rotor vibrations measured at constant low speed is really an image of eccentricity of the rotor 1. The steam turbine mentioned above was shut down in known way whereas the cooling of the machine proceeded on the turning gear. The turning gear was suddenly turned off for a period of 30 minutes. After full stand-still of rotation of the rotor 1, temporary thermal deformation (bend) of the rotor 1 occurred caused by heterogeneous temperature field in the flow path of the turbine, which was not sufficiently cooled resulting in the rotor 1 becoming eccentric. After this period the turning gear was turned on again, while measuring signals from the sensors 3, 30, 4, 40 of relative rotor vibrations and the sensor 50 of the phase marker 5 was initiated and proceeded for following 45 minutes. Thereat, signals of both sensors 3, 30 by the front radial bearing 2 (Y-, X-wise in the plane 330 of measuring) and the sensor 4 by the rear radial bearing 20 (Y-wise in the plane 440 of measuring) were measured. Obtained data were assessed by setting the trajectories of endpoints of phasors of the 1$^{st}$, 2$^{nd}$, 3$^{rd}$ and 4$^{th}$ harmonic component of individual signals in time into the complex plane. The results of assessment are shown in FIGS. 2, 3 and 4; FIG. 2 showing the trajectories of endpoints of phasors of the 1$^{st}$, 2$^{nd}$, 3$^{rd}$ and 4$^{th}$ harmonic component of signal of the sensor 3, FIG. 3 showing trajectories of endpoints of phasors of the 1$^{st}$, 2$^{nd}$, 3$^{rd}$ and 4$^{th}$ harmonic component of signal of the sensor 30 and FIG. 4 showing trajectories of endpoints of phasors of the 1$^{st}$, 2$^{nd}$, 3$^{rd}$ and 4$^{th}$ harmonic component of signal of the sensor 4. The asterisks always represent beginning of the trajectory. It is clear from individual trajectories that the eccentricity of the rotor 1 expressed itself significantly only into trajectory of endpoint of the phasor of the 1$^{st}$ harmonic component of signals in the complex plane. The endpoint positions of phasors of other harmonic components are nearly independent of eccentricity of the rotor 1. Further on, it is evident from these trajectories that expression of eccentricity of the rotor 1 is the same within one plane 330 of measuring as the time behaviour of trajectory of the endpoint of the phasor of the $1^{st}$ harmonic component of the signals measured Y-axis- and X-axis-wise at plane 330 of measuring is analogical. The only difference is mutual phase shift of trajectories by 90°, which is caused by the fact that the sensors 3 and 30 in these directions are installed at exactly that angle against each other. The last finding arising from mentioned trajectories is difference in expressions of eccentricity of the rotor 1 in the plane 330 of measuring and the plane 440 of measuring, caused by the fact that behaviour of the phasor of the $1^{st}$ harmonic component of signals measured Y-wise of both planes 330 and 440 of measuring is different by the rotor 1 being exposed to different thermal loads, as the biggest eccentricity of the rotor 1 does not occur in its centre (to which the current method was attempting to get close by its place of measuring) but where the heterogeneity of the temperature field is most accentuated (i.e. where the temperature gradient is the highest).

The individual calculation steps of the method according to the invention are performed by a HW card with advantage, the current positions of endpoints of phasors of the $1^{st}$ harmonic components of individual measured signals, resp. their trajectories are screen-projected into appropriately set complex plane with advantage.

The method according to the invention can be applied to any rotor 1 with at least one sensor 50 of the phase marker 5 and at least one sensor 3, 30, 4, 40 of relative rotor vibrations. In case that the field instrumentation of given rotor includes more than one sensor 3, 30, 4, 40 of relative rotor vibrations, the signal/signals of any of those sensors 3, 30, 4, 40 can be used to determine current eccentricity of the rotor 1 or to diagnose eccentricity of the rotor 1.

The mathematical methods/models mentioned above were indicated as the most appropriate for determining current eccentricity of rotating rotor 1, although other suitable methods/models can be applied in other alternatives, working on the same or similar principle, or combination of them.

The invention claimed is:

1. A method for determining current eccentricity of rotating rotor (1), wherein, the rotor (1) equipped with a phase marker (5) is at constant speed of rotation up to 500 rpm scanned by a sensor (50) of phase marker (5) at the point of this marker (5), and outside of the phase marker (5) by at least one sensor (3, 30, 4, 40) of relative rotor vibrations, while after digitizing the signals of the sensors (3, 30, 4, 40, 50), there is estimated, based on the digitized signals, a current position of phasor of the $1^{st}$ harmonic component of signal of the sensor (3, 30, 4, 40) of relative rotor vibrations in the complex plane, which is subsequently compared to a reference position of the phasor of the $1^{st}$ harmonic component of this signal, which has been determined in advance, whereas the variation vector of the phasors is an image of eccentricity of the rotor (1).

2. The method according to the claim 1, wherein, the rotor (1) is outside of the phase marker (5) scanned by at least two sensors (3, 30, 4, 40) of relative rotor vibrations, which are located in one plane (330, 440) of measuring perpendicular to the axis (10) of the rotor (1), or by sensors (3, 30, 4, 40) located in different planes (330, 440) of measuring, while for estimation of current position of the phasor of the $1^{st}$ harmonic component of the signal of the sensor (3, 30, 4, 40) of relative rotor vibrations in the complex plane is besides the signal of the phase marker (5) used signal of at least one of them.

3. The method according to claim 1, wherein, the reference position of the phasor of the $1^{st}$ harmonic component of the signal of the sensor (3, 30, 4, 40) of relative rotor vibrations in the complex plane is in advance assessed by estimation from digitized signal of the sensor (50) of the phase marker (5) and digitized signal of the sensor (3, 30, 4, 40) of relative rotor vibrations at scanning straight rotor (1) rotating at constant speed of up to 500 rpm.

4. The method according to claim 1, wherein, the current position of the phasor of the $1^{st}$ harmonic component of the signal of the sensor (3, 30, 4, 40) of relative rotor vibrations in the complex plane is estimated by a method of quadratic optimization of the mathematical model of the signal of the sensor (3, 30, 4, 40) of relative rotor vibrations in the form of Fourier series.

5. The method according to claim 4, wherein, the signal of the sensor (3, 30, 4, 40) of relative rotor vibrations is prior to application of the method of quadratic optimization filtered.

6. The method according to the claim 5, wherein, the signal of the sensor (3, 30, 4, 40) of relative rotor vibrations is filtered by a quadratically optimal low-pass frequency filter of the third order with sharp amplitude characteristics near the cut-off frequency.

7. The method according to claim 1, wherein, the current eccentricities of the rotor (1) in the planes (330, 440) of measuring are used as boundary conditions of a finite element model of the rotor (1) that shows deflection of the rotor (1) along its axis (10).

8. A method for diagnostics eccentricity of rotating rotor (1), wherein, the rotor (1) equipped with a phase marker (5) is at constant speed of rotation up to 500 rpm scanned by a sensor (50) of phase marker (5) at the point of this marker (5), and outside the phase marker (5) by at least one sensor (3, 30, 4, 40) of relative rotor vibrations, while after digitizing the signals of the sensors (3, 30, 4, 40, 50), is from them being estimated current position of the phasor of the $1^{st}$ harmonic component of the signal of the sensor (3, 30, 4, 40) of relative rotor vibrations in the complex plane until stabilizing, and after stabilizing is the position of the endpoint of this phasor compared to position of the endpoint of predefined reference position of the phasor of the $1^{st}$ harmonic component of this signal and/or to its predefined tolerance band, and according to their mutual position the eccentricity of the rotor (1) is diagnosed as acceptable or unacceptable for further operation.

9. The method according to the claim 8, wherein, the tolerance band of the reference position of the endpoint is determined by the finite element method (FEM), while the eccentricity of the rotor (1) is diagnosed as acceptable for further operation only if the endpoint of the phasor of the $1^{st}$ harmonic component of the signal of the sensor (3, 30, 4, 40) of relative rotor vibrations is located within this tolerance band.

10. The method according to claim 8, wherein, the reference position of the phasor of the $1^{st}$ harmonic component of the signal of the sensor (3, 30, 4, 40) of relative rotor vibrations in the complex plane is predetermined by estimation from digitized signal of the sensor (50) of the phase marker (5) and digitized signal of the sensor (3, 30, 4, 40) of relative rotor vibrations at scanning straight rotor (1) rotating at constant speed of up to 500 rpm.

11. The method according to claim 8, wherein, the current position of the phasor of the $1^{st}$ harmonic component of the signal of the sensor (3, 30, 4, 40) of relative rotor vibrations in the complex plane is estimated by a method of quadratic optimization of the mathematical model of the signal of the sensor (3, 30, 4, 40) of relative rotor vibrations in the form of Fourier series.

12. The method according to claim 11, wherein, the signal of the sensor (3, 30, 4, 40) of relative rotor vibrations is prior to application of the method of quadratic optimization filtered.

13. The method according to the claim 12, wherein, the signal of the sensor (3, 30, 4, 40) of relative rotor vibrations is filtered by a quadratically optimal low-pass frequency filter of the third order with sharp amplitude characteristics near the cut-off frequency.

* * * * *